(12) United States Patent
Eldering

(10) Patent No.: US 6,324,519 B1
(45) Date of Patent: Nov. 27, 2001

(54) ADVERTISEMENT AUCTION SYSTEM

(75) Inventor: Charles A. Eldering, Doylestown, PA (US)

(73) Assignee: Expanse Networks, Inc., Doylestown, PA (US)

( * ) Notice: Subject to any disclaimer, the term of this patent is extended or adjusted under 35 U.S.C. 154(b) by 0 days.

(21) Appl. No.: 09/268,520

(22) Filed: Mar. 12, 1999

(51) Int. Cl.[7] .................................................... G06F 17/60
(52) U.S. Cl. .............................................. 705/14; 705/37
(58) Field of Search ............................... 705/14, 10, 26, 705/27, 37; 348/8; 725/42, 9, 14, 47, 46

(56) References Cited

U.S. PATENT DOCUMENTS

| 4,546,382 | 10/1985 | McKenna et al. | 358/84 |
| 5,319,455 | 6/1994 | Hoarty et al. | 348/7 |

(List continued on next page.)

FOREIGN PATENT DOCUMENTS

| WO 98/28906 | * | 7/1998 | (WO) . | |
| 9834189 | | 8/1998 | (WO) . | |
| WO 98/34189 | * | 8/1998 | (WO) | G06F/17/60 |
| WO 97/17774 | * | 5/1997 | (WO) | H04B/17/00 |

OTHER PUBLICATIONS

"Flycast Introduces ValueTrak, The First Event Tracking Proven to Increase The Effectiveness of Web Advertising Campaigns", Press Release, http://www.flycast.com/press, Oct. 27, 1998.*

"Doubleclick Debuts New Tool for Testing Creative on the Web", PRNewswire, Dialog File 613: PR Newswire, May 20, 1996.*

Karpinski, Richard, "Ad Sales Go Real–Time—FlyCast Brings Buyers and Sellers Together to Target Campaigns", Phillips Business Information's Internet Week, Issue 692, p. 19, Dec. 1, 1997.*

"Direct Marketing Primer", Upside, vol. 9, Issue 11, p. 37, Dec. 1997.*

"Flycast Brings Next–Level ROI to Web Advertisers", Press Release, http://www.flycast.com/press, Aug. 11, 1998.*

IEEE Publication "A Framework for Targeting Banner Advertising on the Internet", by Gallagher, K. and Parson, J., Jan. 1997, 12 pages.

Primary Examiner—James P. Trammell
Assistant Examiner—John W. Hayes
(74) Attorney, Agent, or Firm—Douglas J. Ryder

(57) ABSTRACT

An advertisement auction system is presented in which content/opportunity providers announce to advertisers that they have an opportunity to present an advertisement to a consumer. The advertiser transmits ad characterization information which is correlated with the consumer profile. Based on the results of the correlation, the advertisers place bids for the advertisement opportunity. Upon acceptance of a bid the advertisement is delivered to the consumer. The system can be applied to a variety of media including Internet advertisements, advertisements delivered over cable television systems, and printed materials such as magazines and periodicals. The system allows consumers to receive more targeted advertisements which match their lifestyle and interests, insures advertisers that their ads will be received by the appropriate audience, and allows the content/opportunity provider the ability to maximize revenue for the advertising opportunity.

27 Claims, 12 Drawing Sheets

U.S. PATENT DOCUMENTS

| | | | |
|---|---|---|---|
| 5,410,344 | 4/1995 | Graves et al. | 348/1 |
| 5,446,919 | 8/1995 | Wilkins | 455/6.2 |
| 5,515,098 | 5/1996 | Carles | 348/8 |
| 5,532,735 | 7/1996 | Blahut et al. | 348/13 |
| 5,636,346 * | 6/1997 | Saxe | 705/1 |
| 5,724,521 | 3/1998 | Dedrick | 395/226 |
| 5,740,549 * | 4/1998 | Reilly | 705/14 |
| 5,752,238 * | 5/1998 | Dedrick | 70/14 |
| 5,758,257 | 5/1998 | Herz et al. | 455/2 |
| 5,758,328 | 5/1998 | Giovannoli | 705/26 |
| 5,774,170 | 6/1998 | Hite et al. | 348/9 |
| 5,774,868 * | 6/1998 | Cragun et al. | 705/10 |
| 5,781,894 * | 7/1998 | Petrecca et al. | 705/14 |
| 5,794,210 | 8/1998 | Goldhaber et al. | 705/14 |
| 5,835,896 * | 11/1998 | Fisher et al. | 705/37 |
| 5,855,008 * | 12/1998 | Goldhaber et al. | 705/14 |
| 5,905,975 * | 5/1999 | Ausubel | 705/37 |
| 5,915,243 * | 6/1999 | Smolen | 705/14 |
| 5,933,811 * | 8/1999 | Angles et al. | 705/14 |
| 5,948,061 * | 9/1999 | Merriman et al. | 705/14 |
| 5,974,398 * | 10/1999 | Hanson et al. | 705/14 |
| 5,991,735 | 11/1999 | Gerace | 705/10 |
| 6,006,257 | 12/1999 | Slezak | 709/219 |
| 6,009,410 * | 12/1999 | LeMole et al. | 705/14 |
| 6,023,686 * | 2/2000 | Brown | 705/37 |
| 6,026,369 * | 2/2000 | Capek | 705/14 |
| 6,055,510 * | 4/2000 | Henrick et al. | 705/14 |
| 6,058,379 * | 5/2000 | Odom et al. | 705/37 |
| 6,161,099 * | 12/2000 | Harrington et al. | 705/37 |
| 6,253,189 * | 6/2001 | Feezell et al. | 705/14 |

* cited by examiner

ADVERTISEMENT AUCTION SYSTEM

BACKGROUND OF THE INVENTION

The advent of the Internet has resulted in the ability to communicate data across the globe instantaneously and will allow for numerous new applications which enhance consumer's lives. One of the enhancements which can occur is the ability for the consumer to receive advertising which is relevant to their lifestyle. Such "targeted ads" can potentially reduce the amount of unwanted information which consumers receive in the mail, during television programs, and when using the Internet.

From an advertiser's perspective the ability to target ads can be beneficial since they have some confidence that their ad will at least be determined relevant by the consumer, and therefore will not be found annoying because it is not applicable to their lifestyle. The advertiser also desires to maximize the effect of an advertisement and to have an acceptable return on investment from advertising, principally in the form of increased sales.

In the various forms of media including television, printed materials such as magazines and periodicals, and the Internet, opportunities for the transmission of advertisements to consumers frequently arise. The groups who have the opportunities to present advertisements to consumers receive payment from the advertisers, and need to maximize their revenues. In addition, by placing ads which will be found useful by the consumer, the value of the transmitted programming to the consumer may be increased.

For the foregoing reasons, there is a need for an advertisement auction system which can match advertisements with consumers and allow the entity who can present the advertisement to the consumer to maximize their income.

SUMMARY OF THE INVENTION

The present invention provides a means for the auctioning of advertisement opportunities based on the correlation of an advertisement with a consumer profile. The invention can be realized over a network of computers such as the Internet and can be used for the auctioning of advertisements which are delivered as part of broadcast video programming, printed material such as magazines and periodicals, or as part of web site pages.

In a preferred embodiment the invention is realized over a networked computer environment, with notification of an advertising opportunity being presented to at least one advertiser. The advertiser transmits an advertisement characterization which is used to determine the appropriateness of the advertisement to one or more consumers. The results of this determination, in the form of a correlation factor, is transmitted to the advertiser who can subsequently place a bid for the advertisement opportunity. Upon acceptance of the bid the advertisement is delivered to the content/opportunity provider who delivers the ad to the consumer.

In a preferred embodiment the advertisement characterization is in the form of an ad characterization vector, and the consumer characterization is in the form of a consumer characterization vector, with the correlation factor being calculated as the scalar product between the ad characterization vector and the consumer characterization vector.

The ad characterization vector can contain both a demographic characterization of the advertisement as well as a product preference characterization of the advertisement. The consumer characterization vector can contain both demographic and product preference characterizations.

In a preferred embodiment the auction process includes soliciting bids from a plurality of advertisers, and repeating the bidding process to maximize the revenue for the advertising opportunity.

An advantage of the present invention is that advertisers can target their ads at consumers with the appropriate demographic characteristics, and can target consumers who buy a competitor's product. The content/opportunity provider can charge for the advertisement according to how well matched the advertisement is to the consumer and the advertiser's goals. The matching can be in the form of demographic matching, product preference matching, or a combination of both.

The present invention provides for the ability for consumers to receive more targeted advertisements which match their lifestyle and interests, the ability to insure advertisers that their ads will be received by the appropriate audience, and the ability to allow the content/opportunity provider the ability to maximize revenue for the advertising opportunity.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

Figure 1A:
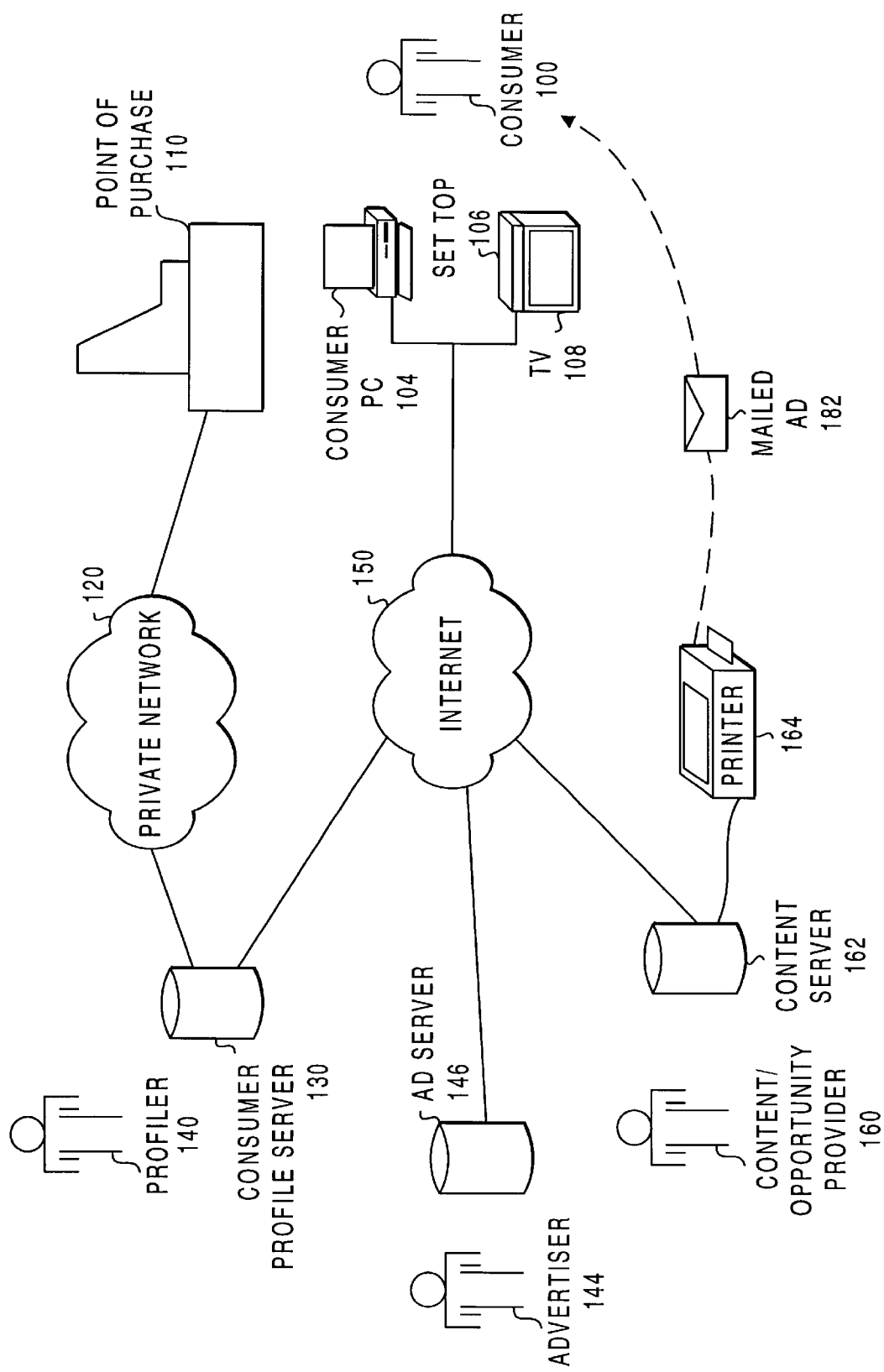
FIGS. 1A and 1B show user relationship diagrams for the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 7 in particular, the method and apparatus of the present invention is disclosed.

FIG. 1A shows a user relationship diagram which illustrates the relationships between a advertisement auction system and various entities. As can be seen in FIG. 1, a consumer 100 can receive information and advertisements from a consumer personal computer (PC) 104, displayed on a television 108 which is connected to a settop 106, or can receive a mailed ad 182.

Advertisements and information displayed on consumer PC 104 or television 108 can be received over an Internet 150, or can be received over the combination of the Internet 150 with another telecommunications access system. The telecommunications access system can include but is not limited to cable TV delivery systems, switched digital video access systems operating over telephone wires, microwave telecommunications systems, or any other medium which provides connectivity between the consumer 100 and a content server 162 and ad server 146.

A content/opportunity provider 160 maintains the content server 162 which can transmit content including broadcast programming across a network such as the Internet 150. Other methods of data transport can be used including private data networks and can connect the content sever 160 through an access system to a device owned by consumer 100.

Content/opportunity provider 160 is termed such since if consumer 100 is receiving a transmission from content server 162, the content/opportunity provider can insert an advertisement. For video programming, content/opportunity provider is typically the cable network operator or the source of entertainment material, and the opportunity is the ability to transmit an advertisement during a commercial break.

The majority of content that is being transmitted today is done so in broadcast form, such as broadcast television programming (broadcast over the air and via cable TV networks), broadcast radio, and newspapers. Although the interconnectivity provided by the Internet will allow consumer specific programming to be transmitted, there will still be a large amount of broadcast material which can be sponsored in part by advertising. The ability to insert an advertisement in a broadcast stream (video, audio, or mailed) is an opportunity for advertiser 144. Content can also be broadcast over the Internet and combined with existing video services, in which case opportunities for the insertion of advertisements will be present.

Although FIG. 1A represents content/opportunity provider 160 and content server 162 as being independently connected to Internet 150, with the consumer's devices being also being directly connected to the Internet 150, the content/opportunity provider 160 can also control access to the subscriber. This can occur when the content/opportunity provider is also the cable operator or telephone company. In such instances, the cable operator or telephone company can be providing content to consumer 100 over the cable operator/telephone company access network. As an example, if the cable operator has control over the content being transmitted to the consumer 100, and has programmed times for the insertion of advertisements, the cable operator is considered to be a content/opportunity provider 160 since the cable operator can provide advertisers the opportunity to access consumer 100 by inserting an advertisement at the commercial break.

In a preferred embodiment of the present invention, a pricing policy can be defined. The content/opportunity provider 160 can charge advertiser 144 for access to consumer 100 during an opportunity. In a preferred embodiment the price charged for access to consumer 100 by content/opportunity provider varies as a function of the applicability of the advertisement to consumer 100. In an alternate embodiment consumer 100 retains control of access to the profile and charges for viewing an advertisement.

The content provider can also be a mailing company or printer which is preparing printed information for consumer 100. As an example, content server 162 can be connected to a printer 164 which creates a mailed ad 182 for consumer 100. Alternatively, printer 164 can produce advertisements for insertion into newspapers which are delivered to consumer 100. Other printed material can be generated by printer 162 and delivered to consumer 100 in a variety of ways.

Advertiser 144 maintains an ad server 146 which contains a variety of advertisements in the form of still video which can be printed, video advertisements, audio advertisements, or combinations thereof.

Profiler 140 maintains a consumer profile server 130 which contains the characterization of consumer 100. The consumer profiling system is operated by profiler 140, who can use consumer profile server 130 or another computing device connected to consumer profile server 130 to profile consumer 100.

Data to perform the consumer profiling is received from a point of purchase 110. Point of purchase 110 can be a grocery store, department store, other retail outlet, or can be a web site or other location where a purchase request is received and processed. In a preferred embodiment, data from the point of purchase is transferred over a public or private network 120, such as a local area network within a store or a wide area network which connects a number of department or grocery stores. In an alternate embodiment the data from point of purchase 110 is transmitted over the Internet 150 to profiler 140.

Profiler 140 may be a retailer who collects data from its stores, but can also be a third party who contracts with consumer 100 and the retailer to receive point of purchase data and profile consumer 100. Consumer 100 may agree to such an arrangement based on the increased convenience offered by targeted ads, or through a compensation arrangement in which they are paid on a periodic basis for revealing their specific purchase records.

Consumer profile server 130 can contain a consumer profile which is determined from observation of the consumer's viewing habits on television 108 or consumer PC 104. Such a characterization is frequently referred to as a subscriber characterization, since it is a profile which is obtained by monitoring the viewing habits of a subscriber. In a preferred embodiment, the channels or web sites viewed by a subscriber are monitored, and heuristic rules are applied to the sites to better determine the demographic and product preference characteristics of the subscriber. Based on the viewing characteristics of the subscriber, and in particular on the viewing time duration, or time spent on each channel or site, a subscriber profile is formed and updated. As an example, when viewing a product commercial, a characterization of the product is formed and based on the subscriber's viewing time for the commercial, the importance of that commercial in the overall demographic and product profile is obtained.

Figure 1B:
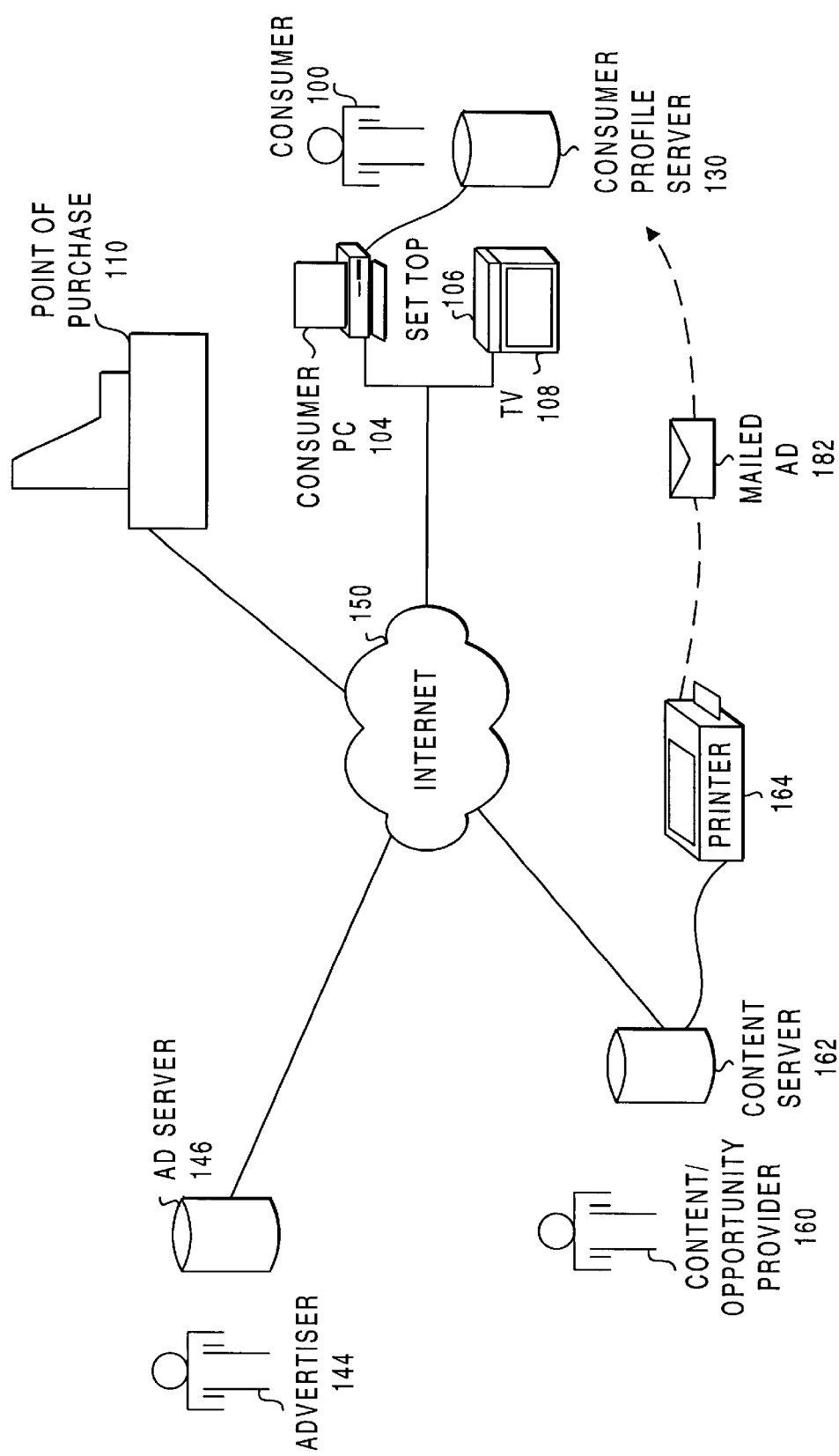

FIG. 1B illustrates an alternate embodiment of the present invention in which the consumer 100 is also profiler 140. Consumer 100 maintains consumer profile server 130 which is connected to a network, either directly or through consumer PC 104 or settop 106. Consumer profile server 130 can contain the consumer profiling system, or the profiling can be performed in conjunction with consumer PC 104 or settop 106. A subscriber characterization system which monitors the viewing habits of consumer 100 can be used in conjunction with the consumer profiling system to create a more accurate consumer profile.

When the consumer 100 is also the profiler 140, as shown in FIG. 1B, access to the consumer demographic and product preference characterization is controlled exclusively by consumer 100, who will grant access to the profile in return for receiving an increased accuracy of ads, for cash compensation, or in return for discounts or coupons on goods and services.

Figure 2A:
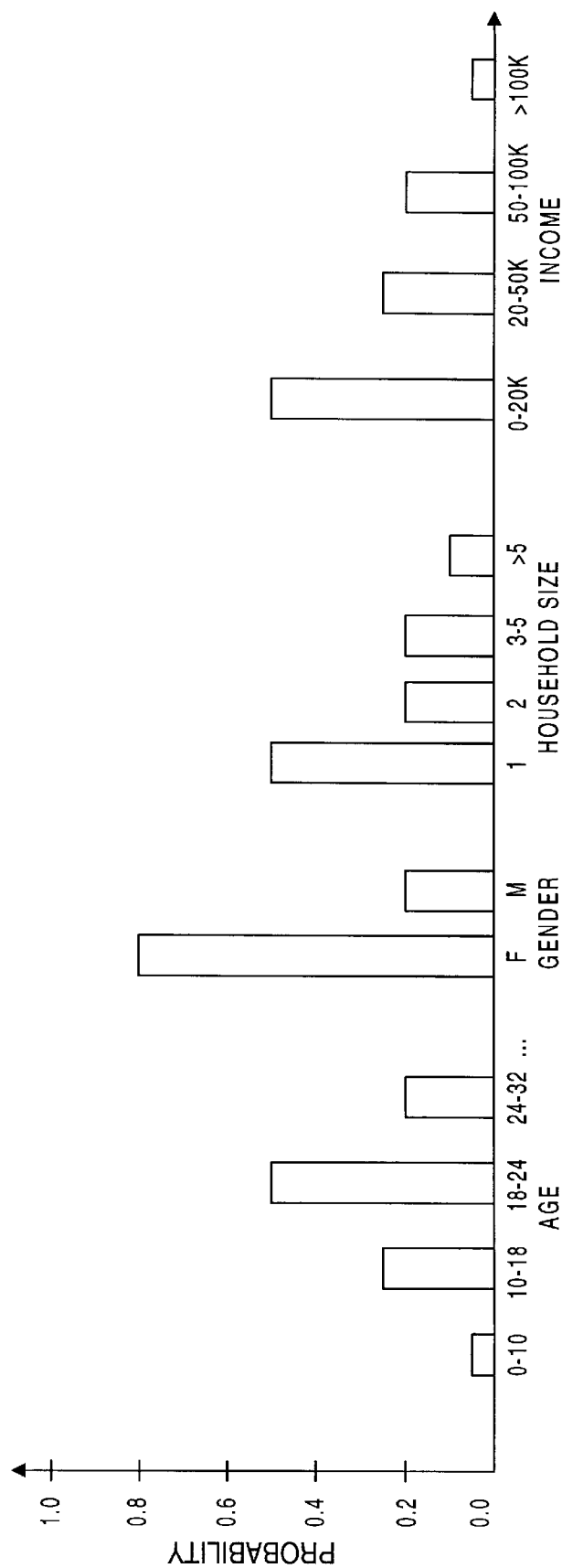
FIGS. 2A, 2B, 2C and 2D illustrate a probabilistic consumer demographic characterization vector, a deterministic consumer demographic characterization vector, a consumer product preference characterization vector, and a storage structure for consumer characterization vectors respectively.

FIG. 2A illustrates an example of a probabilistic demographic characterization vector. The demographic characterization vector is a representation of the probability that a consumer falls within a certain demographic category such as an age group, gender, household size, or income range.

In a preferred embodiment the demographic characterization vector includes interest categories. The interest categories may be organized according to broad areas such as music, travel, and restaurants. Examples of music interest categories include country music, rock, classical, and folk. Examples of travel categories include "travels to another state more than twice a year," and "travels by plane more than twice a year."

Figure 2B:
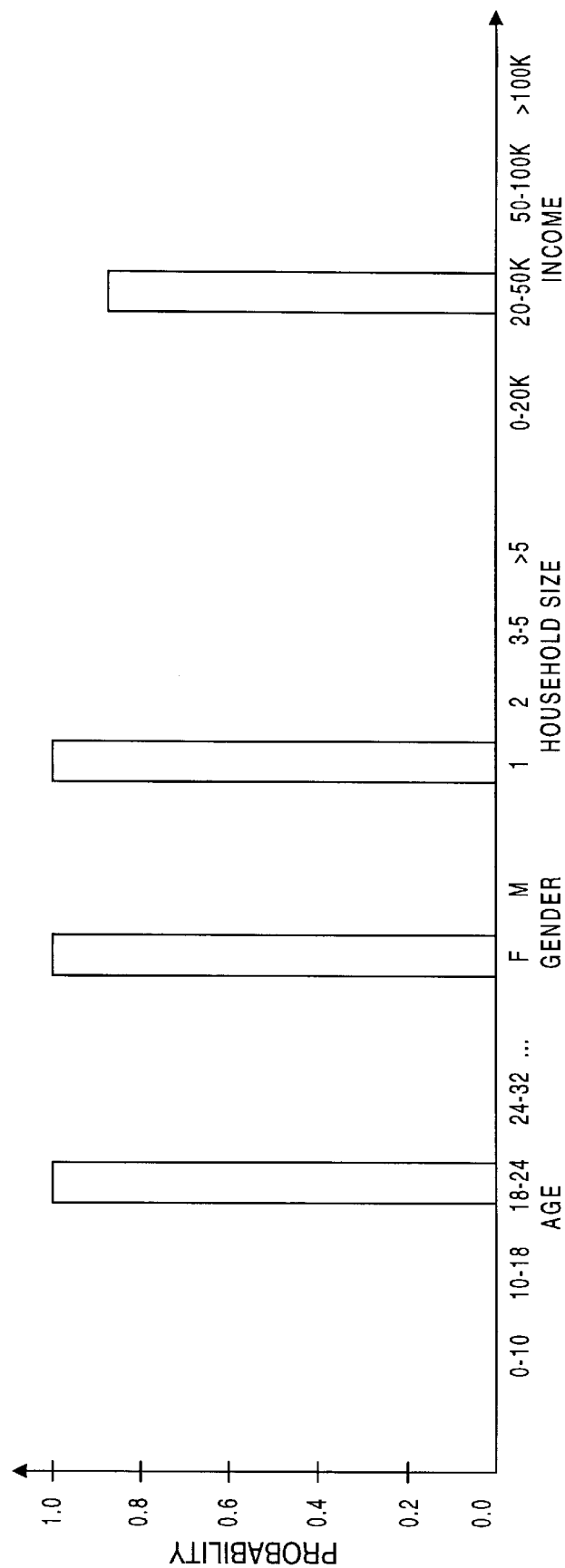

FIG. 2B illustrates a deterministic demographic characterization vector. The deterministic demographic characterization vector is a representation of the consumer profile as determined from deterministic rather than probabilistic data. As an example, if consumer 100 agrees to answer specific questions regarding age, gender, household size, income, and interests the data contained in the consumer characterization vector will be deterministic.

As with probabilistic demographic characterization vectors, the deterministic demographic characterization vector can include interest categories. In a preferred embodiment, consumer 100 answers specific questions in a survey generated by profiler 140 and administered over the phone, in written form, or via the Internet 150 and consumer PC 104. The survey questions correspond either directly to the elements in the probabilistic demographic characterization vector, or can be processed to obtain the deterministic results for storage in the demographic characterization vector.

Figure 2C:
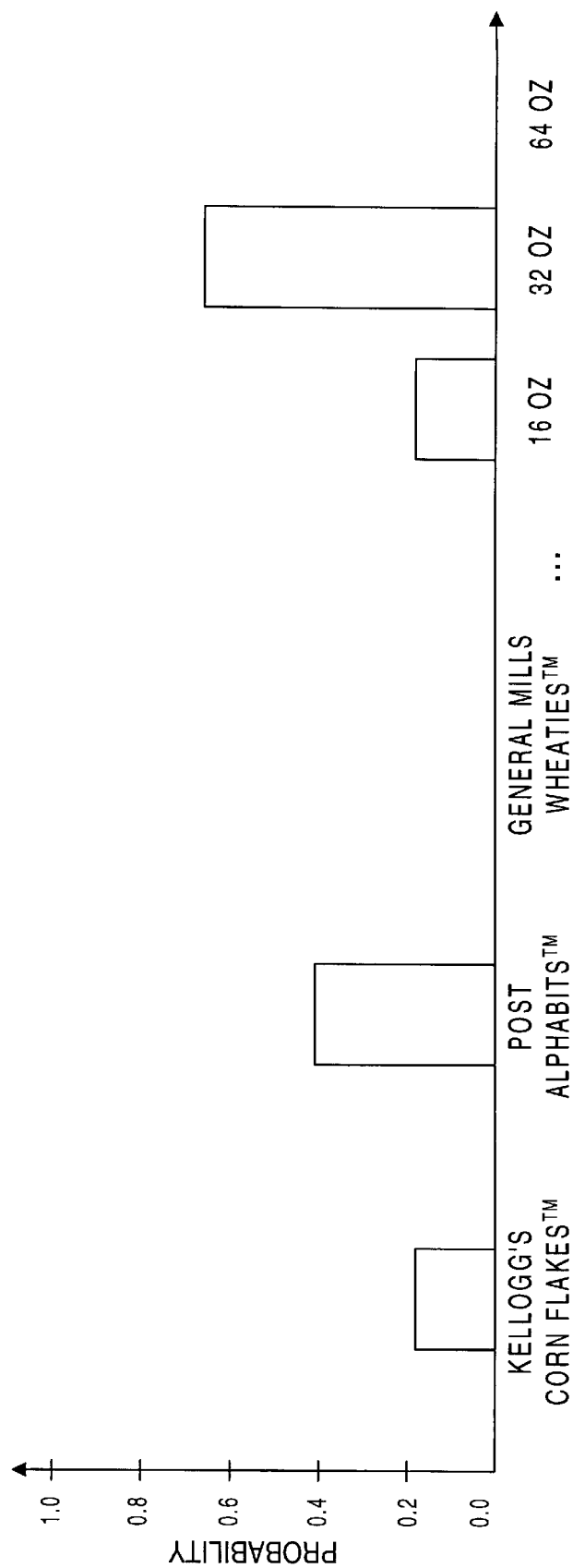

FIG. 2C illustrates a product preference vector. The product preference represents the average of the consumer preferences over past purchases. As an example, a consumer who buys the breakfast cereal manufactured by Post under the trademark ALPHABITS about twice as often as purchasing the breakfast cereal manufactured by Kellogg under the trademark CORN FLAKES, but who never purchases breakfast cereal manufactured by General Mills under the trademark WHEATIES, would have a product preference characterization such as that illustrated in FIG. 2C. As shown in FIG. 2C, the preferred size of the consumer purchase of a particular product type can also be represented in the product preference vector.

Figure 2D:
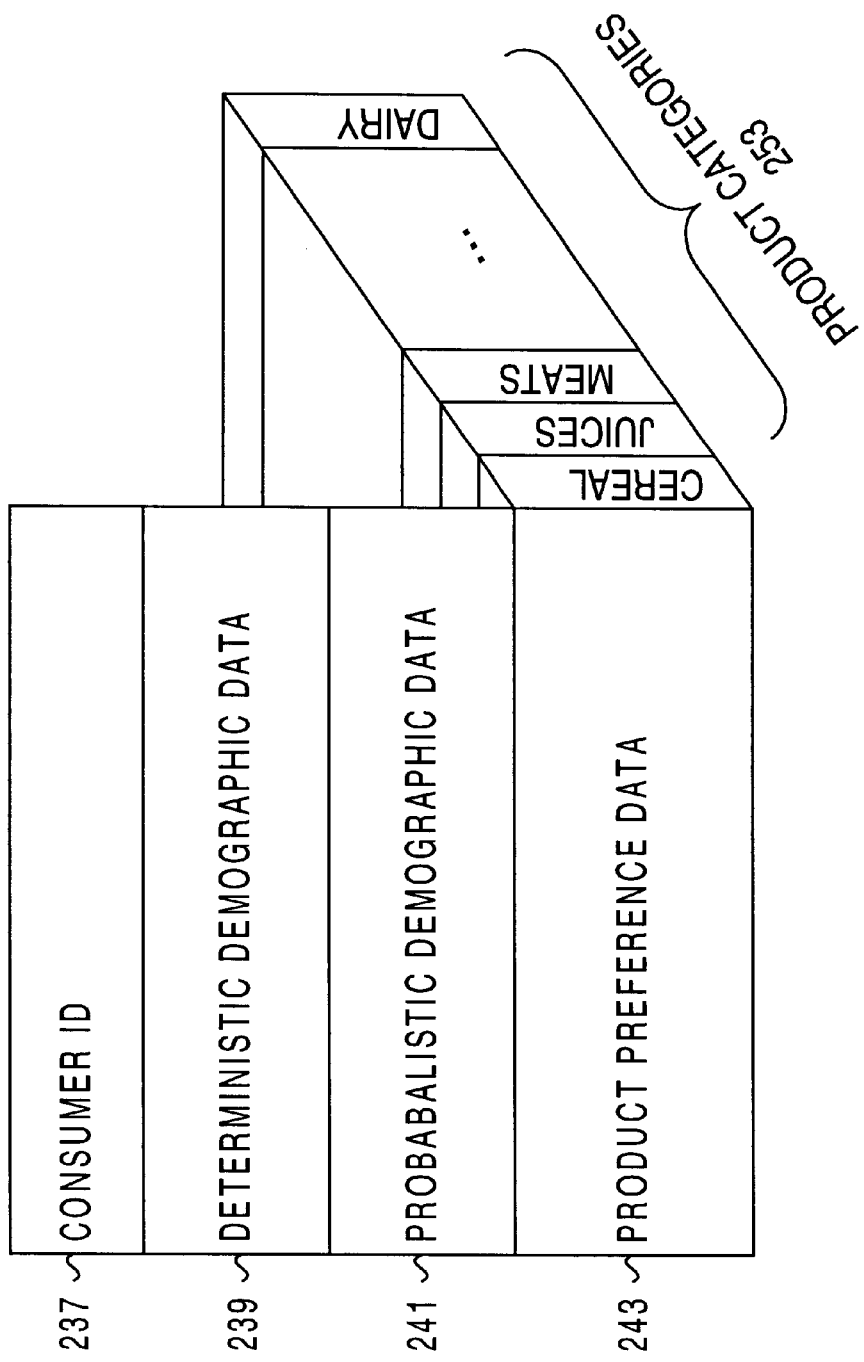

FIG. 2D represents a data structure for storing the consumer profile, which can be comprised of a consumer ID field 237, a deterministic demographic data field 239, a probabilistic demographic data field 241, and one or more product preference data fields 243. As shown in FIG. 2D, the product preference data field 243 can be comprised of multiple fields arranged by product categories 253.

The consumer ID 512 can be any identification value uniquely associated with consumer 100. In a preferred embodiment consumer ID 512 is a telephone number, while in an alternate embodiment consumer ID 512 is a credit card number. Other unique identifiers include consumer name with middle initial or a unique alphanumeric sequence, the consumer address, social security number.

The vectors described and represented in FIGS. 2A–C form consumer characterization vectors that can be of varying length and dimension, and portions of the characterization vector can be used individually. Vectors can also be concatenated or summed to produce longer vectors which provide a more detailed profile of consumer 100. A matrix representation of the vectors can be used, in which specific elements, such a product categories 253, are indexed. Hierarchical structures can be employed to organize the vectors and to allow hierarchical search algorithms to be used to locate specific portions of vectors.

Figure 3A:
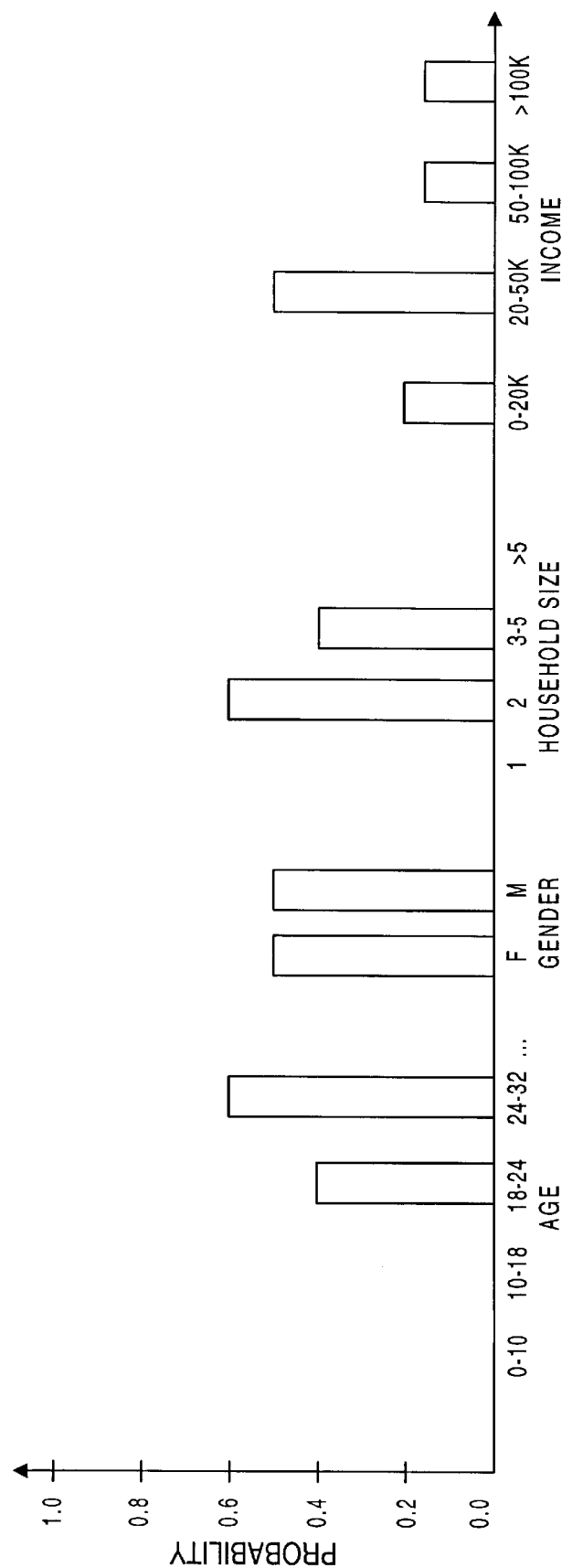
FIGS. 3A and 3B illustrate an advertisement demographic characterization vector and an advertisement product preference characterization vector respectively.
Figure 3B:
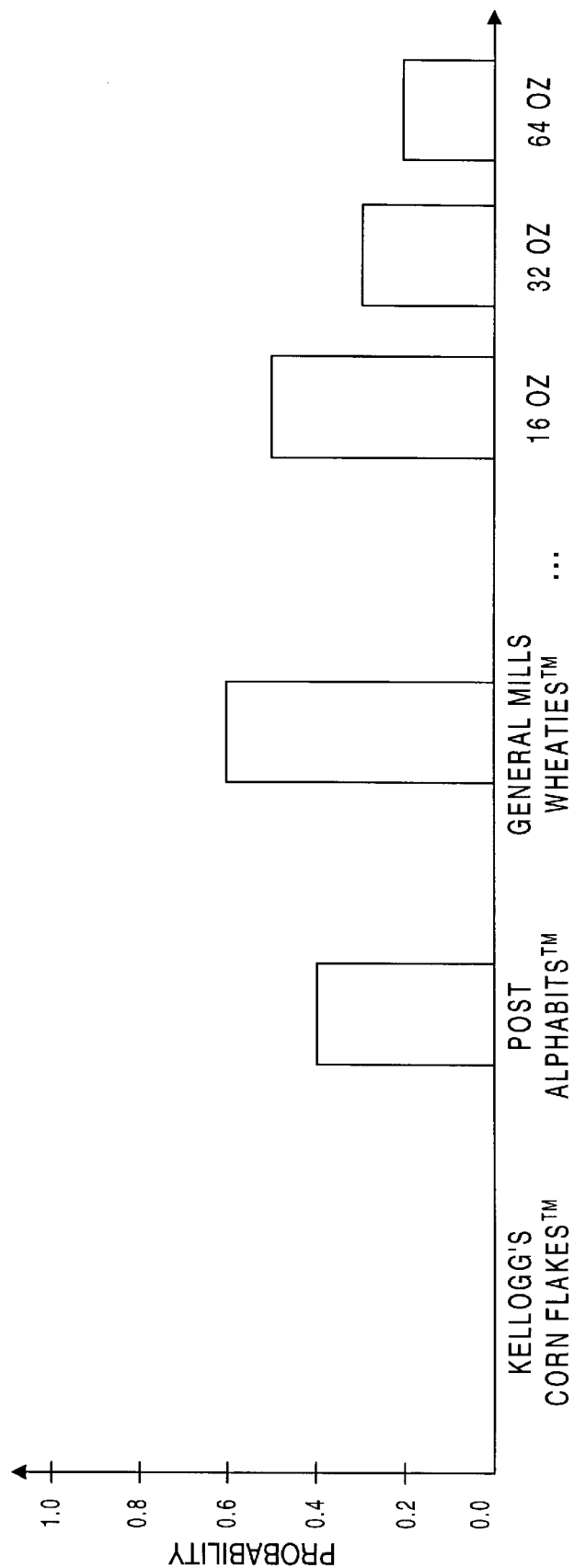

FIGS. 3A and 3B represent an ad demographics vector and an ad product preference vector respectively. The ad demographics vector, similar in structure to the demographic characterization vector, is used to target the ad by setting the demographic parameters in the ad demographics vector to correspond to the targeted demographic group. As an example, if an advertisement is developed for a market which is the 18–24 and 24–32 age brackets, no gender bias, with a typical household size of 2–5, and income typically in the range of $20,000–$50,000, the ad demographics vector would resemble the one shown in FIG. 3A. The ad demographics vector represents a statistical estimate of who the ad is intended for, based on the advertisers belief that the ad will be beneficial to the manufacturer when viewed by individuals in those groups. The benefit will typically be in the form of increased sales of a product or increased brand recognition. As an example, an "image ad" which simply shows an artistic composition but which does not directly sell a product may be very effective for young people, but may be annoying to older individuals. The ad demographics vector can be used to establish the criteria which will direct the ad to the demographic group of 18–24 year olds.

FIG. 3B illustrates an ad product preference vector. The ad product preference vector is used to select consumers which have a particular product preference. In the example illustrated in FIG. 3B, the ad product preference vector is set so that the ad can be directed at purchasers of ALPHABITS and WHEATIES, but not at purchasers of CORN FLAKES. This particular setting would be useful when the advertiser represents Kellogg and is charged with increasing sales of CORN FLAKES. By targeting present purchasers of ALPHABITS and WHEATIES, the advertiser can attempt to sway those purchasers over to the Kellogg brand and in particular convince them to purchase CORN FLAKES. Given that there will be a payment required to present the advertisement, in the form of a payment to the content/opportunity provider 160 or to the consumer 100, the advertiser 144 desires to target the ad and thereby increase its cost effectiveness.

In the event that advertiser 144 wants to reach only the purchasers of Kellogg's CORN FLAKES, that category would be set at a high value, and in the example shown would be set to 1. As shown in FIG. 3B, product size can also be specified. If there is no preference to size category the values can all be set to be equal. In a preferred embodiment the values of each characteristic including brand and size are individually normalized.

Because advertisements can be targeted based on a set of demographic and product preference considerations which may not be representative of any particular group of present consumers of the product, the ad characterization vector can be set to identify a number of demographic groups which would normally be considered to be uncorrelated. Because the ad characterization vector can have target profiles which are not representative of actual consumers of the product, the ad characterization vector can be considered to have discretionary elements. When used herein the term discretionary refers to a selection of target market characteristics which need not be representative of an actual existing market or single purchasing segment.

In a preferred embodiment the consumer characterization vectors shown in FIGS. 2A–C and the ad characterization vectors represented in FIGS. 3A and 3B have a standardized format, in which each demographic characteristic and product preference is identified by an indexed position. In a preferred embodiment the vectors are singly indexed and thus represent coordinates in n-dimensional space, with each dimension representing a demographic or product preference characteristic. In this embodiment a single value represents one probabilistic or deterministic value (e.g. the probability that the consumer is in the 18–24 year old age group, or the weighting of an advertisement to the age group).

Figure 5:
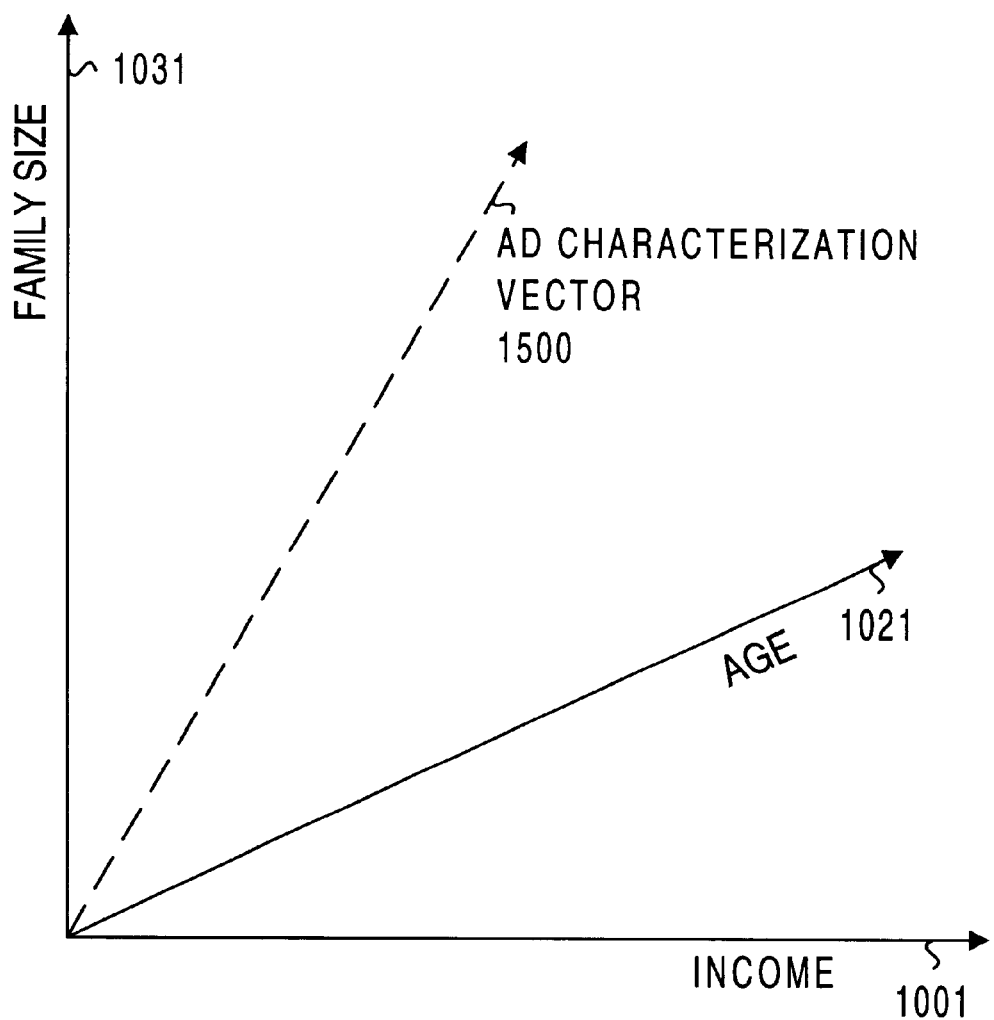
FIG. 5 represents an ad characterization vector with demographic characteristic basis vectors.

FIG. 5 illustrates an alternate embodiment in which a group of demographic or product characteristics form individual vectors which serve as basis vectors. As shown in FIG. 5, age categories form an age basis vector 1021, income categories form an income basis vector 1001, and family size categories forms a family size basis vector 1031. The consumer or ad characterization vector 1500 represents a set of characteristics of the advertisement, and by projecting the ad characterization vector onto age basis vector 1021, income basis vector 1001, family size basis vector 1031, and other similarly defined basis vectors, it is possible to correlate the advertisement against groups of consumer or family characteristics. The extent to which the basis vectors are orthogonal will determine the uniqueness of the correlation result.

In a preferred embodiment, a correlation factor is calculated by taking the scalar product of the consumer characterization vector and the ad characterization vector. In taking the scalar product, each component of the ad characterization vector is multiplied with the corresponding element of the consumer characterization vector, with the sum being formed from all of the multiplications. In a preferred embodiment, each grouping within the vectors is normalized such that the probabilistic measures of age group values all sum to one, the income range values sum to one, and product preference values within a certain category sum to one. The resulting correlation factor can exceed one, with the maximum value being determined by the number of categories which have been normalized. In an alternate embodiment, normalization can be applied to the entire advertisement characterization and consumer characterization vectors, resulting in a normalized correlation result.

In an alternate embodiment correlation is performed by correlating individual aspects of the consumer profile against aspects of the advertisement characterization. The income range for the intended recipient of the advertisement can be correlated against the income range of a subscriber. By correlating one or more aspects of the consumer profile against the advertisement characterization a correlation factor can be determined. Other methods of correlation can be used and are known to those skilled in the art.

The correlation can be performed by profiler 140, content/opportunity provider 160, or may be performed in part by each of these entities.

In addition to generating the consumer characterization from purchasing habits, information regarding the consumer may be determined from monitoring of viewing habits, as described in the applicant's co-pending U.S. patent application Ser. No. 09/205,653 filed on Dec, 3, 1998 entitled "Subscriber characterization system," of which Charles A. Eldering and M. Lamine Sylla are the inventors, which is incorporated herein by reference but not admitted to be prior art. Subscriber characterization can be performed by monitoring the viewing habits of a subscriber who is watching programming which may be delivered over a cable television system or over the Internet. As the subscriber executes channel changes, either in the form of television channel changes or by surfing to another web site, the subscriber characterization system monitors the programming and generates a probabilistic profile of the subscriber. The generation of the profile can be based on the use of textual information associated with the programming. Heuristic rules describing the demographic profiles of subscribers for which the programming is targeted for can be used to create and update the subscriber profile.

The subscriber characterization system can update the subscriber profile based on a weighted average in which the weighting factor is determined as the ratio of the viewing time divided by a session time. In a preferred embodiment the viewing time is determined by monitoring the amount of time a viewer watches a particular program. The volume at which the program is watched is also monitored and can be used in creating the weighting factor. The session time can be determined as the amount of time the viewing device has been on continuously. Other definitions of viewing time and session time, as well as other methods of creating and updating the subscriber profile can be used.

The subscriber characterization system can also be used to determine product preferences by monitoring the extent to which an advertisement is viewed. If the advertisement is viewed in full the system makes the determination that the product or brand represented in the advertisement is of interest to the subscriber, and that other similar products or brands will also be of interest.

The subscriber characterization system produces a subscriber profile which can be considered to be the functional equivalent of the consumer profile. When used herein, the terms consumer characterization and consumer characterization vector encompass subscriber characterization and subscriber characterization vector respectively.

Figure 4:
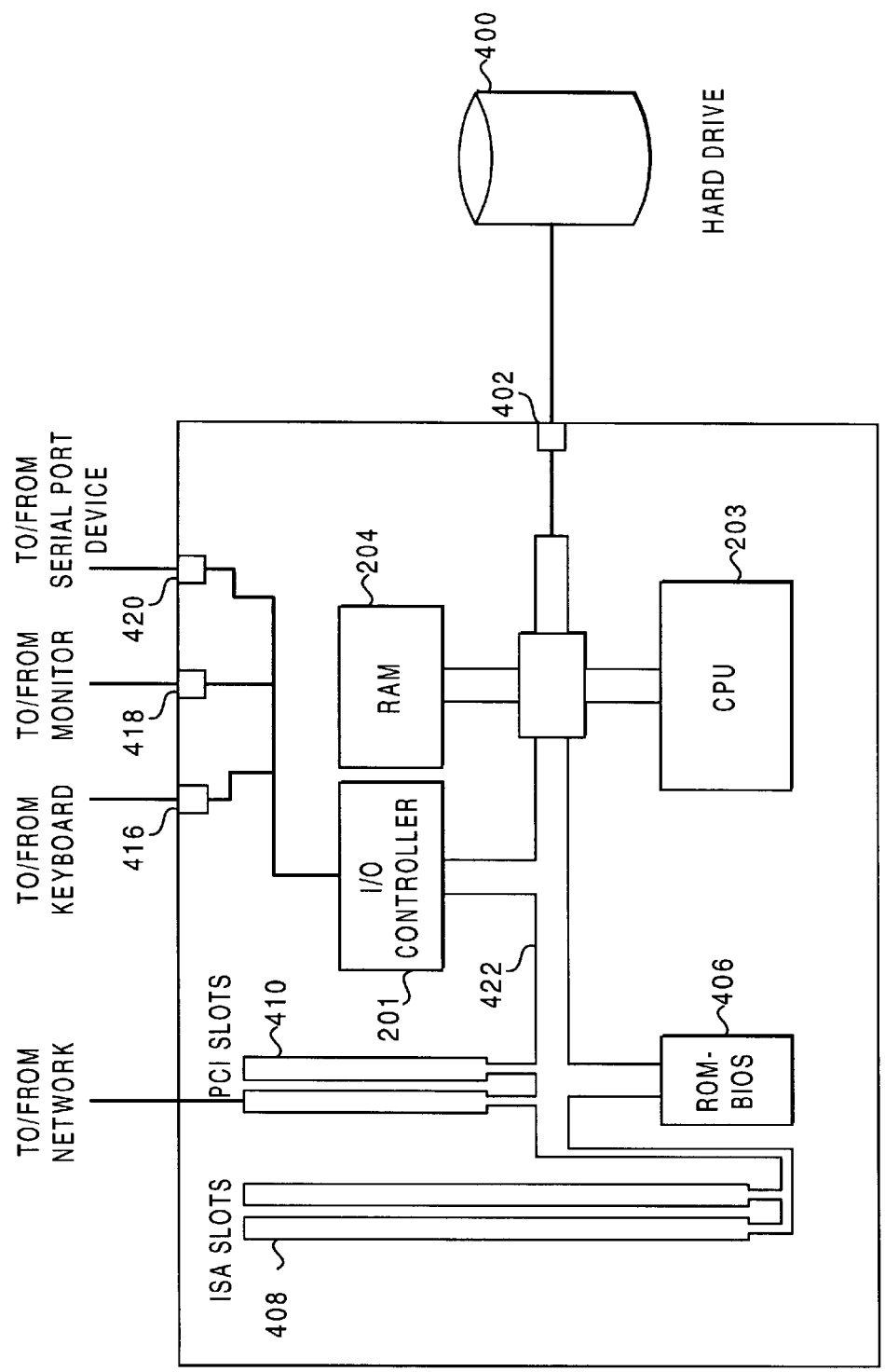
FIG. 4 illustrates a computer system on which the present invention can be realized.

FIG. 4 shows the block diagram of a computer system for a realization of the advertisement auction system. A system bus 422 transports data amongst the CPU 203, the RAM 204, Read Only Memory—Basic Input Output System (ROM-BIOS) 406 and other components. The CPU 203 accesses a hard drive 400 through a disk controller 402. The standard input/output devices are connected to the system bus 422 through the I/O controller 201. A keyboard is attached to the I/O controller 201 through a keyboard port 416 and the monitor is connected through a monitor port 418. The serial port device uses a serial port 420 to communicate with the I/O controller 201. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network. The computer system shown in FIG. 4 can be part of consumer profile server 130, or can be a processor present in another element of the network.

The present invention can be realized in a variety of programming languages including but not limited to C, C++, Smalltalk, Java, Perl, and can be developed as part of a relational database. Other languages and data structures can be utilized to realize the present invention and are known to those skilled in the art.

Although FIG. 4 represents an individual computer which can be used to realize consumer profile server 130, ad server 146, or content server 162, these entities can be realized as distributed platforms in which multiple processors work together over a local area network, wide area network, or the Internet. The invention can be realized on any number of computers which work together to conduct the advertisement auction.

Figure 6:
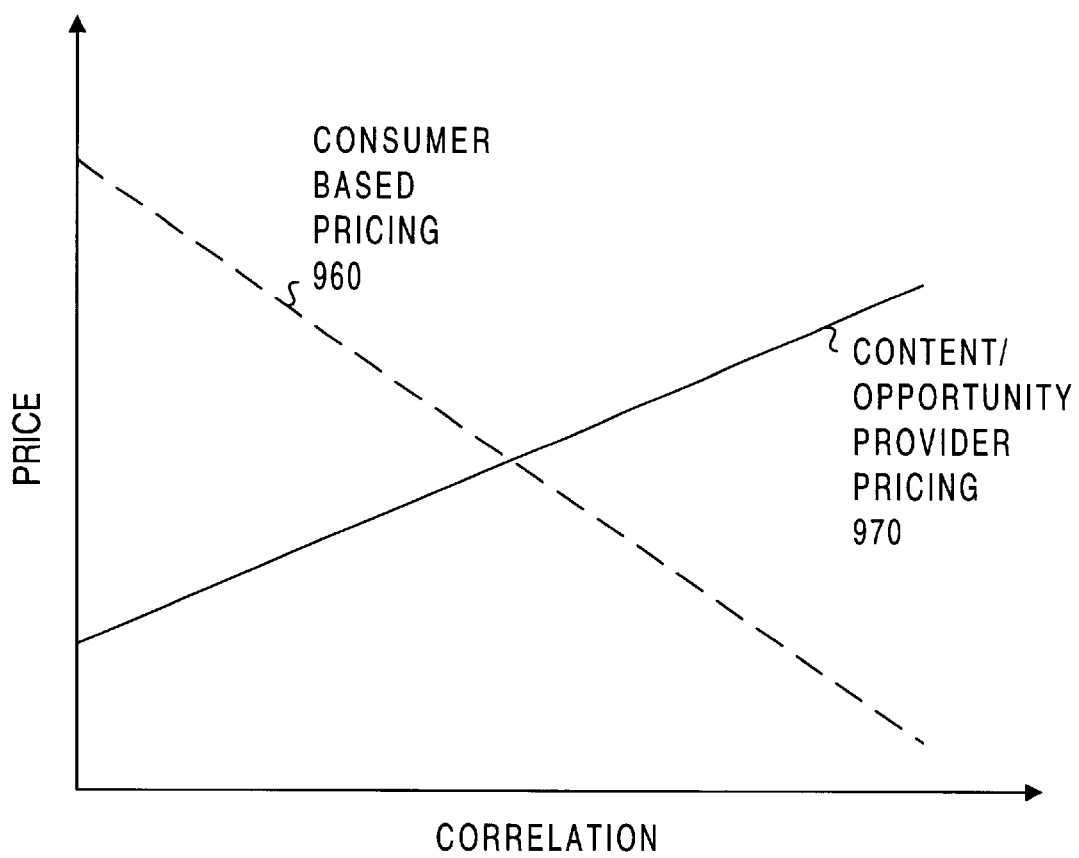
FIG. 6 represents pricing as a function of correlation.

FIG. 6 illustrates two pricing schemes, one for content/opportunity provider based pricing 970, which shows increasing cost as a function of correlation. In this pricing scheme, the higher the correlation, the more the content/opportunity provider 160 charges to air the advertisement.

Content/opportunity provider based pricing 970 presents a pricing scheme in which the charge for presenting an advertisement to a consumer increases as a function of the degree of correlation of the advertisement with the consumer. For advertisements which are more correlated with the consumer and are thus more likely to be successful in terms of the sale of an item related to the advertisement, the price is higher than for advertisements which show a relatively low degree of correlation with the consumer.

FIG. 6 also illustrates consumer based pricing 960, which allows a consumer to charge less to receive advertisements which are more highly correlated with their demographics and interests. Consumer based pricing 960 can be used to allow consumers to preferentially receive advertisements which are highly correlated with their demographic and product preference profiles. As illustrated by consumer based pricing 960 in FIG. 6, the consumer may charge to view and advertisement, but can charge less for advertisements which are highly correlated with their profile, and thus are likely to be of more interest.

Figure 7:
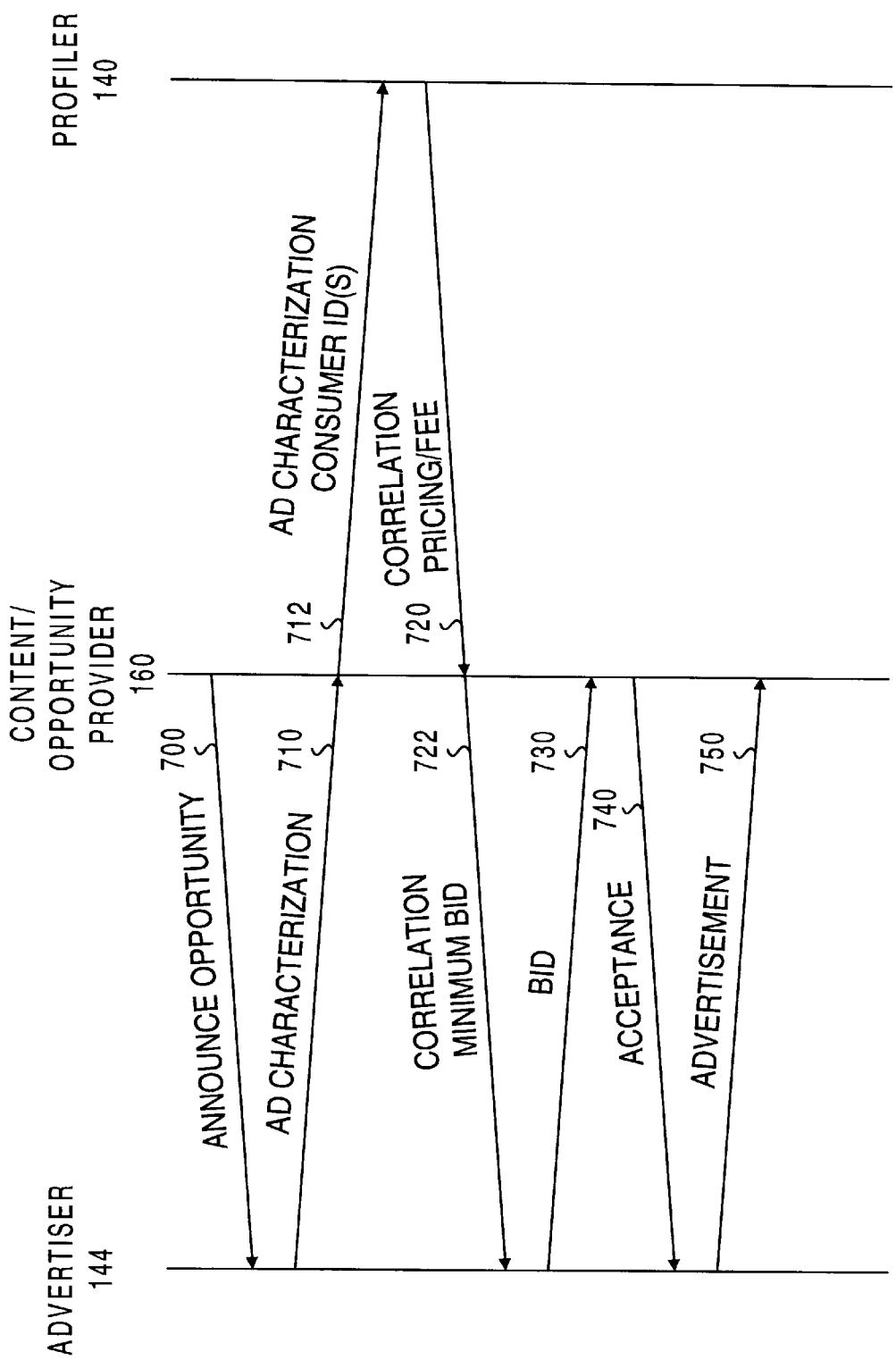
FIG. 7 represents a signal flow diagram for the advertisement auction process.

FIG. 7 illustrates a signal flow diagram indicating the representative signals which are transmitted between advertiser 144, content/opportunity provider 160, and profiler 140. The signal flow diagram represents signals transmitted between the entities marked over time, with time progressing from the top towards the bottom of the diagram. References to advertiser 144, content/opportunity provider 160, and profiler 140, also include the computer systems which represent these individuals or organizations, and can be stand-alone servers, or groups of servers which are networked over a local area or long distance network to produce a virtual organization. As an example, an advertiser can maintain a number of servers and web sites which together contain all of the advertisements related to their accounts. Similarly, the content/opportunity provider system can consist of a network of computers owned by a cable television operator and which are capable of keeping track of all of the advertisement insertion opportunities.

Referring to FIG. 7 content/opportunity provider 160 transmits an announce opportunity message 700 to one or more advertisers 144. The announce opportunity message 700 can be in a number of forms including e-mail messages, announcements on a web site, access to upcoming opportunities downloaded from a File Transfer Protocol (FTP) site, or other electronic means.

In a preferred embodiment, the announce opportunity message 700 consists of a listing of advertising opportunities as posted on a web site. Advertiser 144 uses a manual or automated system to load the web page containing the announce opportunity message 700. Transmission of the announce opportunity message 700 occurs when advertiser 144 loads the web page with the listing of advertising opportunities. The searching for and requesting of web pages by advertiser 144 can be done in an automated fashion using scripts or software agents maintained by the advertiser's computer system.

Advertiser 144 then transmits an ad characterization 710. The ad characterization can be received by content/opportunity provider 160 or directly by profiler 140. In a preferred embodiment content/opportunity provider 160 also adds a consumer ID for one or more consumers for which the opportunity is present, and transmits a combined ad characterization consumer ID(s) message 712 to profiler 140.

In a preferred embodiment the ad characterization 710 is in the form of an ad characterization vector containing both demographic and product preference information. In an alternate embodiment the ad characterization contains fields representing the target audience in a non-vector format. Vectorization can be performed by opportunity/content provider 160, by profiler 140, or by another party.

Profiler 140 retrieves consumer characteristics which can be in the form of probabilistic information regarding the consumer, deterministic data regarding the consumer, or product preference information.

Profiler 140 performs a correlation operation, the results of which are transmitted as a correlation factor or other correlation result to content/opportunity provider 160. In a preferred embodiment a pricing/fee arrangement message which represents the price for providing the advertisement as well as a fee for performing the correlation or accessing the consumer profile is transmitted along the correlation result.

As illustrated in FIG. 7, the combined correlation and pricing/fee message 720 is received by content/opportunity provider 160, who transmits the correlation result to advertiser 144. In a preferred embodiment the correlation result is transmitted along with a minimum bid in a correlation and minimum bid message 722. The minimum bid represents the least amount which will be accepted to transmit the advertisement in the announced opportunity.

Advertiser 144 transmits a bid contained within a bid message 730. The bid represents the amount that an advertiser is willing to pay for a transmission opportunity. In a preferred embodiment the bid is calculated by advertiser 144 based on the results of the correlation.

In a preferred embodiment content/opportunity provider 160 can solicit additional bids from advertiser 144, indicating the highest present bid in a message transmitted to all of the advertisers. In this embodiment the highest present bid is transmitted in a highest present bid message which is transmitted from content/opportunity provider 160 to a plurality of advertisers 144 after the reception of one or more bid messages 730.

Once the content/opportunity provider 160 has determined an acceptable bid, an acceptance message 740 is sent to advertiser 144. The acceptance message 740 completes the contractual arrangement with advertiser 144, and provides notification that the advertisement can be delivered to the consumer.

As shown in FIG. 7, an advertisement is transmitted in an advertisement message 750. Advertisement message 750 includes the advertisement itself along with any other pertinent information including the advertisement duration and other information useful for ad insertion.

Once delivered to content/opportunity provider 160 the advertisement can be delivered to consumer 100. Advertiser 144 is subsequently billed for the advertising opportunity.

With respect to the messages illustrated in FIG. 7 and described herein, the messages can be transmitted in the form of e-mail messages, automated e-mail messages, or can be generated in Java based programming scripts which send messages encapsulated in Internet protocol packets. Other programming languages, operating system script languages, and transport protocols can be used to realize the operations described in FIG. 7 and are known to those skilled in the art.

As an example of the industrial applicability of the invention, the advertisement auction system can be utilized by a cable television operator to solicit and accept bids for advertisements placed in commercial times during broadcast programming. In this application the cable television operator acts as content/opportunity provider 160. The profiler 140 may also be the cable operator, the consumer 100, or a third party paid for access to the consumer profile.

In the cable television application, the cable television operator announces an advertising opportunity which corresponds to a commercial spot of a particular duration, occurring during a particular program. As an example, the cable television operator may announce, via electronic means, the availability of a 30 second spot during a prime time sitcom. Such an announcement can be transmitted well in advance of the commercial spot, or can be broadcast a few minutes before the commercial spot is available.

Upon receiving notification of the opportunity, advertisers transmit an ad characterization. The cable operator performs a correlation operation between the ad characterization and the consumer profile. In the event that the cable operator is the profiler the cable operator directly performs a correlation to determine a correlation factor between the advertisement and the consumer/subscriber. Alternatively, the cable operator commissions a correlation to the consumer or a third party, and in receiving a correlation factor, accomplishes the step of correlation. The subscribers in the cable system may not be presently watching the program, and the correlation result can indicate the potential match of the advertisement to the consumer/subscriber, predicated on their viewing of the program.

Having received a correlation result the cable operator transmits the correlation to the advertiser, and may also send a minimum bid which indicates the lowest acceptable bid for that commercial spot. The advertiser transmits a bid, and when notified of acceptance of the bid, transmits the advertisement for insertion into the commercial spot. The advertisement can be transmitted in a variety of digital formats including MPEG or other proprietary video format, and inserted into the broadcast stream for transmission to the subscriber.

In broadcast cable television systems, individual channels will be established for transmission of the subscriber specific advertisement, with instructions being issued to the subscriber equipment to tune to that channel for reception of the targeted advertisement. Alternate mechanisms for delivery of specific video programming in cable television environments are well known to those skilled in the art. In switched digital video systems each subscriber receives individualized programming and the targeted advertisement can be inserted directly in the subscriber's video stream.

In the previously discussed application for cable television the cable television operator will prefer to solicit bids from multiple advertisers, and can repeat the bid process in order to obtain the highest bid possible for the commercial spot.

Another application of the present invention is for the delivery of targeted printed material, such as the insertions into periodicals including magazines and newspapers. In this application, the publisher, printer and delivery organization serve as content/opportunity provider 160. Knowing that they will deliver a newspaper or other periodical to consumer 100, they announce an advertisement opportunity to the advertising community. Advertisers respond with ad characterization information, and upon receiving correlation results, place bids to have their printed material inserted into the periodical. The content/opportunity provider selects a bid and upon receiving the advertisement, prints the ad, inserts it into the periodical, and delivers it to the subscriber.

Yet another application of the present invention is the delivery of targeted advertisements over the Internet. In this application a consumer can be accessing web sites and may be presented with a web site which contains advertising opportunities. The server hosting the page acts as content/opportunity provider 100. Upon accessing the web site the server hosting the page announces an advertising opportunity to advertisers. Advertisers transmit ad characterization information which is correlated against the consumer by a profiler. The profiler may be the consumer, the Internet service provider, or another entity which provides a profiling service.

The results of the correlations are received by the advertisers who then place bids to have their ads transmitted to the consumer. The server hosting the web page selects a bid, notifies the advertiser, and transmits the advertisement to the consumer as part of the web site the consumer has accessed.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for auctioning advertising opportunities, the method comprising:

constructing a profile of a subscriber based on activities of the subscriber;

recognizing an advertisement opportunity in a medium;

providing notification of the advertisement opportunity to advertisers;

receiving advertisement characterizations from the advertisers, wherein the advertisement characterizations characterize an associated advertisement;

determining a correlation between the advertisement characterizations and the subscriber profile, wherein the correlation is calculated as a scalar product between the ad characterization and the subscriber profile;

providing the correlation to the advertisers;

receiving bids for the advertisement opportunity from the advertisers;

selecting the winning bid.

2. The method of claim 1, wherein said receiving bids and said selecting the winning bid are conducted over the Internet.

3. The method of claim 1, further comprising determining an initial winning bid;

transmitting the initial winning bid to the advertisers; and receiving additional bids from the advertisers, wherein said selecting the winning bid is performed subsequent to said determining an initial winning bid, said transmitting the initial winning bid, and said receiving additional bids.

4. The method of claim 3, wherein said determining an initial winning bid includes determining a highest bid; and said transmitting includes transmitting the highest bid to the advertisers.

5. The method of claim 4, wherein said determining a highest bid and said transmitting the highest bid are continually performed until said receiving additional bids does not produce additional bids.

6. The method of claim 4, wherein said receiving bids, said determining a highest bid, said transmitting the highest bid, said receiving additional bids and said selecting the winning bid are conducted over the Internet.

7. A method for auctioning advertising opportunities, the method comprising:
  constructing a profile of a subscriber based on activities of the subscriber, wherein the activities of the subscriber include television viewing transactions;
  recognizing an advertisement opportunity in a medium;
  providing notification of the advertisement opportunity to advertisers;
  receiving advertisement characterizations from the advertisers, wherein the advertisement characterizations characterize an associated advertisement;
  determining a correlation between the advertisement characterizations and the subscriber profile, wherein the correlation is calculated as a scalar product between the advertisement characterizations and the subscriber profile;
  providing the correlation to the advertisers;
  receiving bids for the advertisement opportunity from the advertisers; and
  selecting the winning bid.

8. The method of claim 7, wherein the activities of the subscriber further include point-of-purchase transactions.

9. The method of claim 7, wherein the activities of the subscriber further include Internet viewing transactions.

10. The method of claim 7, wherein said constructing a profile of a subscriber includes generating one or more subscriber characterization vectors based on one or more predetermined parameters.

11. The method of claim 7, wherein said constructing a profile of a subscriber includes characterizing the subscriber based on publicly available data.

12. The method of claim 7, wherein said constructing a profile of a subscriber includes characterizing the subscriber based on private data.

13. The method of claim 7, wherein the advertisement characterizations characterize the advertisement based on one or more predetermined parameters.

14. The method of claim 7, wherein the subscriber profile includes a demographic characterization of the subscriber, and the ad characterization includes a demographic characterization of a target market for the advertisement.

15. The method of claim 7, wherein the subscriber profile includes a product preference characterization of the subscriber, and the ad characterization includes a product preference characterization of a target market for the advertisement.

16. The method of claim 7, wherein said recognizing an opportunity is performed by the subscriber and said providing the correlation includes providing the correlation and a target price for the advertisement opportunity, the target price being inversely proportional to the correlation.

17. The method of claim 7, wherein said recognizing an opportunity is performed by a content/opportunity provider and said providing the correlation includes providing the correlation and a target price for the advertisement opportunity, the target price being directly proportional to the correlation.

18. The method of claim 16, wherein the target price is a minimum acceptable price.

19. The method of claim 7, wherein the subscriber profile and the advertisement characterization are in the form of vectors.

20. The method of claim 7, wherein the medium is a program stream.

21. A system for auctioning an advertisement opportunity, the system comprising:
  means for determining a subscriber profile based on subscriber activities;
  means for announcing an advertisement opportunity, wherein each advertisement opportunity corresponds to an opportunity to place an advertisement in a program;
  means for receiving advertisement characterizations from one or more advertisers, wherein each advertisement characterization corresponds to an advertisement;
  means for correlating the advertisement characterizations with the subscriber profile to produce a correlation result, wherein the correlation result is calculated as a scalar product between the ad characterization and the subscriber profile;
  means for transmitting the correlation result to the one or more advertisers;
  means for receiving a bid for the advertisement opportunity from the advertisers; and
  means for determining if the bid is acceptable.

22. The system of claim 21, wherein said means for determining determines the subscriber profile based on the subscriber activities including point-of-purchase transactions, television viewing transactions, and Internet viewing transactions.

23. The system of claim 21, further comprising means for setting a target price for the advertisement opportunity, wherein said means for announcing an advertisement opportunity is controlled by the subscriber and said means for transmitting the correlation result also transmits the target price, the target price being inversely proportional to the correlation results.

24. The system of claim 21, further comprising means for setting a target price for the advertisement opportunity, wherein said means for announcing an advertisement opportunity is controlled by a content/opportunity provider and said means for transmitting the correlation result also transmits the target price, the price to transmit an advertisement to a subscriber is directly proportional to the correlation results.

25. A computer program embodied on a computer-readable medium for auctioning an advertisement opportunity, the computer program comprising:
  a source code segment for receiving an advertisement characterization;
  a source code segment for creating subscriber profiles based on subscriber activities;
  a source code segment for calculating a correlation factor between the advertisement characterization and the subscriber profile as the scalar product of the ad characterization and the subscriber profile;
  a source code segment for transmitting the correlation factor to one or more advertisers;
  a source code segment for receiving a bid for the opportunity; and
  a source code segment for selecting a successful bid which results in transmission of the advertisement to the subscriber.

26. The computer program of claim 25, wherein the subscriber activities include point-of-purchase transactions, television viewing transactions and Internet viewing transactions.

27. A method for auctioning a right to transmit an advertisement to a consumer, in an advertising opportunity, based on a correlation between a consumer profile and advertisement profiles, the method comprising:

receiving transaction data for the consumer;

constructing the consumer profile based on the transaction data, wherein the consumer profile characterizes the consumer;

receiving the advertisement profiles from advertisers, wherein the advertisement profiles characterize associated advertisements;

correlating the advertisement profiles and the consumer profile, wherein said correlating includes calculating a scalar product between the ad characterization and the subscriber profile;

providing the results of said correlating to the advertisers;

receiving bids for the advertisement opportunity from the advertisers based on the provided results;

determining the winning bid;

transmitting notification of the winning bid to the advertiser; and permitting the advertisement to be transmitted to the consumer in the advertisement opportunity.

* * * * *

UNITED STATES PATENT AND TRADEMARK OFFICE
CERTIFICATE OF CORRECTION

| | |
|---|---|
| PATENT NO. | : 6,324,519 B1 |
| APPLICATION NO. | : 09/268520 |
| DATED | : November 27, 2001 |
| INVENTOR(S) | : Charles A. Eldering |

It is certified that error appears in the above-identified patent and that said Letters Patent is hereby corrected as shown below:

Column 3, line 15, delete "sever 160" and replace with --server 162--;

Column 3, line 41, delete "to" and replace with --the--;

Column 4, line 5, delete "162" and replace with --164--;

Column 12, line 51, delete "advertisers;" and replace with --advertisers; and--;

Signed and Sealed this

Twentieth Day of March, 2007

JON W. DUDAS
*Director of the United States Patent and Trademark Office*